United States Patent [19]

Golden et al.

[11] Patent Number: 5,589,537
[45] Date of Patent: Dec. 31, 1996

[54] SINGLE PHASE SOLIDS OF POLYMERIZABLE METAL CLUSTERS

[75] Inventors: Josh H. Golden, Stamford, Conn.; Francis J. DiSalvo; Jean M. J. Frechet, both of Ithaca, N.Y.

[73] Assignee: Cornell Research Foundation, Inc., Ithaca, N.Y.

[21] Appl. No.: 485,685

[22] Filed: Jun. 7, 1995

Related U.S. Application Data

[63] Continuation-in-part of Ser. No. 245,574, May 18, 1994, abandoned.

[51] Int. Cl.$^6$ .............................. C08K 3/10; C08F 30/04
[52] U.S. Cl. .................... 524/780; 524/779; 524/785; 524/789; 526/240; 526/241
[58] Field of Search .................... 524/779, 780, 524/789, 785; 526/240, 241

[56] References Cited

U.S. PATENT DOCUMENTS

| | | | |
|---|---|---|---|
| 3,427,264 | 2/1966 | Forster et al. | 524/439 |
| 3,960,805 | 6/1976 | Taylor | 524/783 |
| 4,251,576 | 2/1981 | Osborn et al. | 524/789 |
| 4,297,267 | 10/1981 | Leatherman | 524/780 |
| 4,471,078 | 9/1984 | Ida | 524/780 |
| 4,948,739 | 8/1990 | Charmot | 524/785 |
| 5,064,877 | 11/1991 | Nass et al. | 526/240 |

*Primary Examiner*—Tae Yoon
*Attorney, Agent, or Firm*—Bruce F. Jacobs; Diderico Van Eyl

[57] ABSTRACT

Single phase solid materials containing metal clusters are produced by dissolving a metal cluster having chemically bound polymerizable organic ligands in a polymerizable organic solvent, homogeneously dispersing the metal cluster, and then copolymerizing the organic solvent and the chemically bound polymerizable organic ligands.

16 Claims, No Drawings

SINGLE PHASE SOLIDS OF POLYMERIZABLE METAL CLUSTERS

CROSS-REFERENCE TO RELATED APPLICATION

This application is a continuation-in-part of U.S. Ser. No. 08/245,574, filed May 18, 1994, now abandoned.

BACKGROUND OF THE INVENTION

The present invention is broadly directed to the preparation of mixed organic-inorganic single phase solids from polymerizable organic compounds which are solvents for copolymerizable metal clusters having chemically bound polymerizable ligands. More specifically, this invention produces near monodisperse nanoclusters in a polymer host by cluster copolymerization with a solubilizing monomer-solvent medium. As used herein, a "metal cluster" is a molecular complex with metal-metal bonds that form triangular or larger closed structures. A metal cluster is to be distinguished from linear metal compounds of the formula M-M-M as well as from cage compounds in which metal atoms are held together by bridging ligands, typically organic. "Single phase" refers to a substantially homogeneous dispersion of dissolved portions of the metal clusters dispersed throughout a matrix of a polymerized organic solvent. The presence of a single phase may be confirmed by conventional techniques such as scanning transmission electron microscopy (STEM) and scanning electron microscope (SEM) analyses.

Substantial research efforts are being focused on the design and fabrication of organic materials containing metal clusters because of expected applications of such materials in the fields of optics and electronics. Metal clusters have displayed a variety of useful physical properties including catalysis, magnetism, and size-dependent light absorption (the quantum size effect). A major problem in the preparation of such materials is the prevention of both phase separation and aggregation of the clusters within a host matrix. Strategies attempted heretofore to control cluster aggregation, size and morphology have included electrochemical synthesis of surfactant-stabilized clusters, in situ formation of metal clusters in the polar segments of diblock copolymers, and metal vapor deposition. None of these have enabled the preparation of the products of this invention.

U.S. Pat. No. 4,297,267 (Leatherman) discloses dissolving a simple hexavalent chromium compound in a liquid diol bis(allyl carbonate) polymerizable solvent to form, after polymerization of the liquid diol, optically clear colored lenses and the like. Leatherman is limited to the use of hexavalent chromium compounds. U.S. Pat. No. 4,471,078 (Ida) discloses the preparation of selective light absorptive methacrylate resins by adding simple low molecular weight neodynium compounds (about 573 daltons) to a resin-forming methacrylic starting material and then polymerizing the methacrylic monomer. Neither patent discloses anything about metal clusters.

Solutions of metal clusters that have polymerizable organic ligands bound to the metal on the surface of the cluster also appear to polymerize and thus solidify faster than identical solutions not containing the metal clusters, since the cluster-bound monomers copolymerize with the solubilizing monomer-solvent medium to form a highly crosslinked and highly uniform matrix. Unlike simple mixtures and ordinary composites, the inorganic substance is chemically bound and thus compatibilized to the organic polymer host, providing a more uniform molecular nanocomposite. The compatibilization of the normally disparate components leads to more homogeneous optical and mechanical properties which is expected to make the products particularly beneficial for applications in nanoscale electronic, optical and mechanical devices.

Accordingly, it is an object of the present invention to prepare a solution of a polymerizable organic solvent and a metal cluster having chemically bound ligands which are copolymerizable with the organic-monomer solvent.

It is a further object to polymerize the solution to prepare a single phase solid material which contains the metal clusters homogeneously distributed throughout.

SUMMARY OF THE INVENTION

The present invention is directed to a solution of a polymerizable organic solvent and a metal cluster having chemically bound ligands which are copolymerizable with the organic solvent. The invention is further directed to a single phase solid having a substantially homogenous copolymer dispersion of a dissolved metal cluster throughout a matrix of a polymerized organic solvent, wherein the inorganic substance is dissolved in the polymerizable organic solvent prior to polymerization. The solution and the single phase solid are formed, in part, from a polymerizable organic solvent that by itself is capable of dissolving the metal cluster. The polymerizable organic solvent and the dissolved metal cluster are mixed so as to form a homogeneous solution. Thereafter, the polymerizable organic solvent and chemically bound polymerizable ligands of the homogeneous solution are copolymerized to form a single phase solid containing the metal clusters.

DETAILED DESCRIPTION OF THE INVENTION

A suitable polymerizable organic solvent is capable of (i) acting as a ligand to the metal cluster, (ii) substantially dissolving the metal clusters with bound ligands and (iii) undergoing polymerization. By "acting as a ligand" is meant that the organic molecule is capable of chemically binding to the metal cluster and thus solubilizing the cluster in a thermodynamic sense. A convenient way to identify a polymerizable organic solvent for use with a particular metal cluster is to first identify a readily available, and preferably inexpensive, non-polymerizable organic solvent which will act as a ligand and dissolve the metal cluster. Thereafter, a polymerizable analog of the non-polymerizable solvent can be evaluated to see if it too will act as a ligand and dissolve the inorganic substance. In this case, the polymerizable organic solvent will be a modification (derivative) of a conventional non-polymerizable organic solvent. Specific examples of non-polymerizable solvents useful for identifying polymerizable organic solvents include: propylene carbonate, ethylene carbonate, N-methylimidazole, N-methylpyrrolidone, pyridine, dimethyl sulfoxide, acetonitrile, and the like.

A non-polymerizable organic solvent can be made polymerizable by, for example, replacing a C—C— group with a polymerizable vinyl group (C=C—), or by the addition of such a vinyl group. The solvent is generally polar and, when modified to be polymerizable, the resulting solvent retains substantially all of its original polarity so that it will remain capable of acting as a ligand dissolving the metal cluster.

The polymerizable organic solvent is typically capable of dissolving several different metal clusters, and similarly, each metal cluster is typically capable of being dissolved in several polymerizable organic solvents and forming a single phase solid with several polymerizable organic solvents. Generally, suitable polymerizable solvents will contain a polymerizable vinyl (C=C—) group. Specific examples of polymerizable organic solvents that can also act as a ligand include: vinylene carbonate, 4-ethenyl-1,3-dioxolan-2-one, (2-oxo-1,3-dioxolan-4-yl)methyl acrylate, (2-oxo-1,3-dioxolan-4-yl) methyl methacrylate, (2-oxo-1,3-dioxolan-4-yl) methyl vinyl ether, N-vinylpyrrolidone, 4-vinyl-pyridine, phenyl vinyl sulfoxide, acrylonitrile, methacrylonitrile, acrylamide, N-vinylimidazole and the like.

A suitable metal cluster with chemically bound polymerizable ligands is any metal cluster which can be chemically bound to polymerizable ligands. Preferred metal clusters will have at least two polymerizable organic ligands chemically bound thereto which will enable the cluster to function as a cross-linking agent. The ligands may be bound to the metal clusters by known metathetic substitution chemistry as described in Johnston et al, *Inorganic Chemistry*, 31, 1869 (1992), the subject matter of which is incorporated herein by reference.

An example of a specific system is N-vinylimidazole (NVI) and the inorganic metal cluster (n-buty$_4$)$_2$ [Mo$_6$Cl$_8$(triflate)$_6$] which may form a crosslinking agent metal cluster having the formula of [Mo$_6$Cl$_8$(NVI)$_6$] (triflate)$_4$]. The [Mo$_6$Cl$_8$(NVI)$_6$](triflate)$_4$] may subsequently be treated with more N-vinylimidazole, mixed, and the resulting solution polymerized into a single phase solid that swells to a degree dependent upon the amount of crosslinking metal cluster added. Also, complete solidification can be reached many times faster than with N-vinylimidazole alone. By this practice, one may control the degree of crosslinking by varying the concentration of the crosslinking metal cluster in the precursor solution.

Specific examples of metal clusters with bound polymerizable ligands include: [Mo$_6$Cl$_8$(N-vinylimidazole)$_6$] (triflate)$_4$; [Co$_3$(CO)$_9$—(C$_9$H$_7$)]; and Rh$_{22}$(CO)$_{34}$(N-vinylimidazole)$_3$]. Examples of metal cluster cations include such as Nb$_6$Cl$_8$(4-vinylpyridine)$_6$]$^{4+}$; [Ta$_6$Cl$_8$(acrylamide)$_6$]$^{4+}$; [Pt$_{38}$(CO)$_{40}$(4-vinylpyridine)$_4$H$^2$]$^{2+}$; [Au$_{13}$(p-dimethylphenyl-vinyl)$_{10}$Cl$_2$]$^{3+}$ and the like. Suitable anions for use with these cations include (PF$_6$)$^{4-}$, (BPh$_4$)$_4$$^{4-}$ wherein Ph is phenyl, SO$_4$$^{2-}$, and (BPh$_4$)$_3$$^{3-}$. A preferred family of metal clusters is [Mo$_6$Cl$_6$(L)$_6$]$^n$ where n=4+ when L is a neutral ligand, or n=2− when L is a monovalent anion.

The organic matrices of single phase solids prepared from the metal clusters with chemically bound polymerizable ligands typically exhibit properties of the metal clusters at the molecular level in a homogenous pattern. This is believed due to the polymerizable organic solvent's capacity to coordinate with or solvate the metal cluster, which enables the metal cluster to be similarly homogeneously dispersed in the solid organic matrix formed after the polymerization of the solvent.

A process for preparing a solution and a single phase solid is as follows. The preparation of the solution first requires (a) identifying one or more polymerizable solvents that also acts as a ligand for one or more metal clusters, (b) dissolving the metal cluster(s) in the polymerizable solvent, and (c) stirring the resulting solution so that the dissolved metal cluster and organic solvent are substantially completely homogeneously and molecularly mixed. If there is undissolved metal cluster it may be separated if desired. Once this solution is prepared, a free radical generator may be added to the solution, dissolved therein, and the solution polymerized into a single phase solid. Alternatively, the free radical generator may be added earlier in the process if the polymerizable organic solvent will not undergo premature polymerization in its presence due to the mixing. Also alternatively, the solution may contain a conventional organic crosslinking agent. This permits reaching the gel point of the system earlier than otherwise would occur and can be useful to prevent any premature phase separation. Suitable such crosslinking agents include triacrylate, diacrylate, and divinylbenzene compounds. Also alternatively, the polymerizable organic solvent and metal cluster may react when mixed. In this case, the solvent-monomer can replace an existing ligand on the metal cluster and form a more well-defined chemically bound entity.

The identification of suitable metal clusters and polymerizable organic solvents requires matching a polymerizable organic solvent that acts as a ligand in which the metal cluster is soluble. The availability, cost, intended use, and the physical properties of the polymerizable solvent after polymerization are some considerations when selecting a particular polymerizable organic solvent.

Once the polymerizable organic solvent and the inorganic substance have been identified for a particular system, the metal cluster is dissolved in the polymerizable organic solvent at any suitable temperature, for example in the range of about 0 to about 60° C., and pressure, commonly atmospheric. The specific amount of dissolved metal cluster will vary with the particular features of the metal cluster and the solvent, but substantial changes in the physical characteristics of the polymerized solvent are observed at concentrations of metal cluster as low as $10^{-5}$ molar (M). As such, the concentration of the dissolved metal cluster will generally will be in the range of about $10^{-5}$M to about 2M, preferably about $10^{-3}$M to about 1M.

The polymerizable organic solvent may also be capable of mixing with an additional polymerizable organic solvent, and forming a copolymer with that additional solvent. The choice of secondary monomer, if any, will be dictated by considerations such as the desired physical properties of the final solid product, e.g. toughness, elasticity, resistance to U.V. radiation (sunlight), solvent resistance, weathering, and the like.

Polymerization of the polymerizable organic solvent in the homogeneously mixed solution is generally accomplished by the addition of a free radical generator to the solution and the application of heat or ultraviolet light (UV) to decompose the generator into its radical components. A free radical generator such as 2,2'-azobis(isobutyronitrile) (AIBN) or a peroxide such as benzoyl peroxide are typically decomposed thermally while the free radical generator Irgacure-651 (Ciba-Geigy) is decomposed by UV radiation in the range of about 200–380 nm. Since free radical polymerization is well known, further details of alternative free radical generators and operating conditions may be readily found in the literature and thus are not provided here. Depending upon the stability of a system to polymerization, the free radical generator may be added to the polymerizable organic solvent either before or after formation of the polymerizable organic solvent-metal cluster solution. The kinetics of the polymerization must be fast in order to ensure that the gel point is reached early so that phase separation or aggregation processes do not occur.

The present invention will now be described with reference to the following example. It is understood that the example is for illustrative purposes only and should not be deemed as limiting this invention. All parts and percents are by weight unless otherwise stated.

EXAMPLE

The metal cluster (n-buty$_4$)$_2$[Mo$_6$Cl$_8$(triflate)$_6$] was treated with a polar monomer, N-vinylimidazole (NVI), to form [Mo$_6$Cl$_8$—(NVI)$_6$]triflate)$_4$ a metal cluster having chemically bound polymerizable ligands, which was isolated and characterized by elemental analysis and $^1$H NMR, IR, and UV-VIS spectroscopies. This cluster, with six organic monomer ligands bound to a metal cluster, was dissolved in neat N-vinylimidazole monomer and formed a transparent homogeneous solution of the modified metal clusters dissolved in N-vinylimidazole. 0.005, 0.1, and 0.5M solutions were prepared and polymerized by adding 1 mole % of 2,2'-azobis(isobutyronitrile) (AIBN) initiator. The mixtures were magnetically stirred for about 0.5 hr or until dissolution of the AIBN was completed. The solutions were each then transferred to suitable reaction vessels, e.g. sealed vials or ampules, under an argon atmosphere, and then placed in an oil bath at about 70° C. for 24 hrs. Complete solidification occurred ion each case within about 15 to 20 min. with some darkening to yellow-amber. After 24 hrs at about 70° C., the solids were broken out of the reaction vessels, ready to be machined or ground into a suitable shape.

Both the 0.1M and 0.5M solutions solidified ten times faster than a neat N-vinylimidazole which was polymerized in the same exact fashion as a control. These results demonstrate that the metal clusters containing bound polymerizable ligands are acting as crosslinking agents by ligand copolymerization with the monomer solvent media. In addition, the swelling behavior of the materials was evaluated. The polymers from both the 0.1 and 0.5M solutions behaved consistently as crosslinked polymeric materials. The 0.5M polymer displayed little or no swelling in deuterated dimethylsulfoxide, even after 6 months at room temperature.

STEM and Energy Dispersive X-Ray (EDAX) analyses in the 0.005 M sample revealed monodisperse 10 Å diameter clusters in the polymer host of the correct elemental composition. In the more concentrated samples, no evidence for phase separation was observed using x-ray diffraction, SEM microprobe, and STEM.

What is claimed is:

1. A mixed organic-inorganic single phase solid comprising a homogeneous molecular mixture of a polymerized organic solvent and a metal cluster, wherein the metal cluster is dissolved in said solvent prior to polymerization thereof and contains chemically bound ligands copolymerizable with said solvent.

2. The single phase solid of claim 1, further containing a free radical generator.

3. The single phase solid of claim 1, wherein the polymerized organic solvent contains a polymerized vinyl group.

4. The single phase solid of claim 1, wherein the metal cluster is [Mo$_6$Cl$_6$(L)$_6$]$^n$ where n=4+ when L is a neutral ligand or n=2− when L is a monovalent anion.

5. The single phase solid of claim 1, wherein the metal cluster is selected from the group consisting of [Mo$_6$Cl$_8$(N-vinylimidazole)$_6$](triflate)$_4$; [Co$_3$(CO)$_9$(C$_9$H$_7$)]; and Rh$_{22}$(CO)$_{34}$(N-vinylimidazole)$_3$].

6. The single phase solid of claim 1, wherein the metal cluster is a cation selected from the group consisting of Nb$_6$Cl$_8$(4-vinylpyridine)$_6$]$^{4+}$; [Ta$_6$Cl$_8$(acrylamide)$_6$]$^{4+}$; [Pt$_{38}$(CO)$_{40}$(4-vinylpyridine)$_4$H$_2$]$^{2+}$; and ]Au$_{13}$(p-dimethylphenyl-vinyl)$_{10}$Cl$_2$]$^{3+}$, in combination with an anion.

7. The single phase solid of claim 6, wherein the anion is selected from the group consisting of (PF$_6$)$^{4-}$, (BPh$_4$)$^{44-}$, SO$_4^{2-}$, and (BPh$_4$)$_3^{3-}$, wherein Ph is phenyl.

8. The single phase solid of claim 1, wherein the metal cluster is [Mo$_6$Cl$_8$(N-vinylimidazole)$_6$](triflate)$_4$ and the organic solvent is N-vinylimidazole.

9. A mixed organic-inorganic solution comprising a homogeneous molecular mixture of a polymerizable organic solvent and a metal cluster, wherein the metal cluster is dissolved in said solvent and contains chemically bound ligands copolymerizable with said solvent.

10. The solution of claim 9, further containing a free radical generator.

11. The solution of claim 9, wherein the polymerizable organic solvent contains a polymerizable vinyl group.

12. The solution of claim 9, wherein the metal cluster is [Mo$_6$Cl$_6$(L)$_6$]$^n$ where n=4+ when L is a neutral ligand or n =2− when L is a monovalent anion.

13. The solution of claim 9, wherein the metal cluster is selected from the group consisting of [Mo$_6$Cl$_8$(N-vinylimidazole)$_6$](triflate)$_4$; [Co$_3$(CO)$_9$(C$_9$H$_7$)]; and Rh$_{22}$(CO)$_{34}$(N-vinylimidazole)$_3$].

14. The solution of claim 9, wherein the metal cluster is a cation selected from the group consisting of Nb$_6$Cl$_8$(4-vinylpyridine)$_6$]$^{4+}$; [Ta$_6$Cl$_8$(acrylamide)$_6$]$^{4+}$; [Pt$_{38}$(CO)$_{40}$(4-vinylpyridine)$_4$H$_2$]$^{2+}$; and [Au$_{13}$(p-dimethylphenyl-vinyl)$_{10}$Cl$_2$]$^{3+}$, in combination with an anion.

15. The solution of claim 14, wherein the anion is selected from the group consisting of (PF$_6$)$^{4-}$, (BPh$_4$)$_4^{4-}$, SO$_4^{2-}$, and (BPh$_4$)$_3^{3-}$, wherein Ph is phenyl.

16. The solution of claim 9, wherein the metal cluster is [Mo$_6$Cl$_8$(N-vinylimidazole)$_6$](triflate)$_4$ and the organic solvent is N-vinylimidazole.

\* \* \* \* \*

UNITED STATES PATENT AND TRADEMARK OFFICE
CERTIFICATE OF CORRECTION

PATENT NO.  : 5,589,537

DATED       : Dec. 31, 1996

INVENTORS   : Golden et al.

It is certified that errors appear in the above-identified patent and that said Letters Patent is hereby corrected as shown below:

Column 1, line 10: Please insert --This invention was made with government support under Grant No. DMR-9121654 awarded by the National Science Foundation. The government has certain rights in the invention.--

Signed and Sealed this

Tenth Day of February, 1998

Attest:

BRUCE LEHMAN

Attesting Officer

Commissioner of Patents and Trademarks